United States Patent
Gervasi et al.

(10) Patent No.: US 8,268,399 B2
(45) Date of Patent: Sep. 18, 2012

(54) POLYHEDRAL OLIGOMERIC SILSESQUIOXANE IMAGE CONDITIONING COATING

(75) Inventors: David J. Gervasi, Pittsford, NY (US); Bryan J. Roof, Newark, NY (US); Matthew M. Kelly, W. Henrietta, NY (US); Santokh Badesha, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 548 days.

(21) Appl. No.: 12/544,031

(22) Filed: Aug. 19, 2009

(65) Prior Publication Data

US 2011/0045186 A1 Feb. 24, 2011

(51) Int. Cl.
*B05D 5/12* (2006.01)
*C09D 183/04* (2006.01)
*C07F 7/08* (2006.01)
*H01B 3/44* (2006.01)

(52) U.S. Cl. ............ 427/277; 427/278; 106/287.16; 556/443; 556/454; 347/6; 524/263; 524/269

(58) Field of Classification Search .......... 106/287.16; 427/277, 278; 556/443, 454; 347/6; 524/263, 524/269
See application file for complete search history.

(56) References Cited

U.S. PATENT DOCUMENTS

| | | | |
|---|---|---|---|
| 4,529,752 A * | 7/1985 | Bluestein | 523/214 |
| 5,919,559 A * | 7/1999 | Nakano et al. | 428/331 |
| 6,284,377 B1 | 9/2001 | Veerasamy | |
| 6,336,963 B1 * | 1/2002 | Malhotra et al. | 106/31.29 |
| 6,648,467 B1 * | 11/2003 | Pan et al. | 347/103 |
| 6,923,533 B2 * | 8/2005 | Pan et al. | 347/103 |
| 7,125,926 B2 * | 10/2006 | Satoh et al. | 524/502 |
| 7,211,362 B2 | 5/2007 | Chen et al | |
| 7,468,231 B2 | 12/2008 | Lin et al. | |
| 7,786,209 B2 * | 8/2010 | Carlini et al. | 524/588 |
| 2002/0081520 A1 | 6/2002 | Sooriyakumaran et al. | |
| 2006/0058436 A1 * | 3/2006 | Kasler | 524/261 |
| 2006/0078724 A1 | 4/2006 | Bhushan et al. | |
| 2006/0177748 A1 * | 8/2006 | Wu et al. | 430/58.2 |
| 2006/0202288 A1 * | 9/2006 | Yamamoto et al. | 257/410 |
| 2008/0124640 A1 * | 5/2008 | Wu et al. | 430/58.8 |
| 2009/0141110 A1 | 6/2009 | Gervasi et al. | |
| 2009/0142112 A1 | 6/2009 | Gervasi et al. | |
| 2010/0075245 A1 * | 3/2010 | Watanabe et al. | 430/123.41 |

FOREIGN PATENT DOCUMENTS

WO  WO 03/102695 A   12/2003

OTHER PUBLICATIONS

Moorlag et al., U.S. Appl. No. 12/186,886, entitled "Fuser Member Coating Having Polysilsesquioxane Outer Layer," filed Aug. 5, 2008.

(Continued)

*Primary Examiner* — Robert S Loewe
(74) *Attorney, Agent, or Firm* — Marylou J. Lavole

(57) ABSTRACT

A contact leveling surface for an ink jet imaging member including a coating disposed on a contact leveling substrate, wherein the coating includes a fluoroalkyl-substituted polyhedral oligomeric silsesquioxane. In embodiments, the contact leveling surface is for an ink jet imaging member that jets a phase change ink, a gel ink, a curable phase change ink, or a curable gel ink directly to a final image receiving substrate such as a direct to paper imaging device.

19 Claims, 4 Drawing Sheets

OTHER PUBLICATIONS

Zhou et al., U.S. Appl. No. 12/337,688, entitled "Toners Containing Polyhedral Oligomeric Silsesquioxanes," filed Dec. 18, 2008.
Zhou et al., U.S. Appl. No. 12/337,682, entitled "Toners Containing Polyhedral Oligomeric Silsesquioxanes," filed Dec. 18, 2008.
Rios et al., "The Effect of Polymer Surface on the Wetting and Adhesion of Liquid Systems," J. Adhesion Sci. Technol., vol. 21, No. 3-4, pp. 227-241 (2007).
Ahuja et al., "Nanonails: A Simple Geometrical Approach to Electrically Tunable Superlyophobic Surfaces," Langmuir, vol. 24, No. 1, 2008, Published on Web Oct. 12, 2007, pp. 9-14.
Material Profiles, Viton® GF, Aug. 6, 2009, http:/www.rlhudson.com, 3 pages.
Zisman, "Relation of the Equilibrium Contact Angle to Liquid and Solid Constitution," Advances in Chemistry Series, (1964), 43, 1-51.
Koene et al., "Ultrahydrophobic Coatings," Smart Coatings Proceeding, Feb. 27-29, 2008, 40 pages.
European Search Report issued for European Patent Application No. 10171997.9—2115/2289974 (related to corresponding to U.S. Appl. No. 12/544,031), dated Apr. 18, 2011, 5 pages.

* cited by examiner

POLYHEDRAL OLIGOMERIC SILSESQUIOXANE IMAGE CONDITIONING COATING

BACKGROUND

Disclosed herein is an image conditioning coating, and more particularly a contact leveling coating for a contact leveling member in a printing device. The contact leveling coating can be used with imaging materials including toners, solid inks, flexographic inks, and lithographic inks to provide offset-free, robust, and reliable image conditioning and to provide improved reliability of print engine components. In a specific embodiment, a contact leveling coating for a direct to paper ink jet imaging member is disclosed. In another specific embodiment, a contact leveling coating for use with phase change inks, and curable gel inks is disclosed.

Fluid ink jet systems typically include one or more printheads having a plurality of ink jets from which drops of fluid are ejected towards a recording medium. The ink jets of a printhead receive ink from an ink supply chamber or manifold in the printhead which, in turn, receives ink from a source, such as a melted ink reservoir or an ink cartridge. Each ink jet includes a channel having one end in fluid communication with the ink supply manifold. The other end of the ink channel has an orifice or nozzle for ejecting drops of ink. The nozzles of the ink jets may be formed in an aperture or nozzle plate that has openings corresponding to the nozzles of the ink jets. During operation, drop ejecting signals activate actuators in the ink jets to expel drops of fluid from the ink jet nozzles onto the recording medium. By selectively activating the actuators of the ink jets to eject drops as the recording medium and/or printhead assembly are moved relative to one another, the deposited drops can be precisely patterned to form particular text and graphic images on the recording medium.

Ink jet printing systems commonly use either a direct printing architecture or an offset printing architecture. In a typical direct printing system, ink is ejected from jets in the printhead directly onto the final receiving web or substrate such as paper. In an offset printing system, the image is formed on an intermediate transfer surface and subsequently transferred to the final receiving substrate such as a web or individual substrate such as paper.

Phase change inks (sometimes referred to as "solid inks" or "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Solid ink is typically jetted at a temperature of about 105° C. and has a melt viscosity at a jetting temperature of about 10 centipoise. Ultra-violet curable gel ink is typically jetted at a temperature of about 75° C. and has a melt viscosity at jetting temperature of about 10 centipoise.

Phase change inks are desirable for ink jet printers because they remain in a highly viscous phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

In a typical phase change ink printing device, the jetted ink image solidifies on the liquid intermediate transfer surface or on the final substrate for a direct to final substrate device by cooling to a malleable solid intermediate state as the drum (or other imaging member configuration such as belt, etc.) continues to rotate or advance. When the imaging has been completed, a transfer roller is moved into contact with the drum to form a pressurized transfer nip between the roller and the curved surface of the intermediate transfer surface/drum. A final receiving substrate, such as a sheet of paper, is then fed into the transfer nip and the ink image is transferred to the final receiving web. For direct to final substrate devices, a final receiving substrate, such as a sheet of paper, is moved into contact with the drum via a sheet feeding device such as a sheet feeding roller, to form a pressurized transfer nip between the sheet feeding roller and the drum, and the ink image is transferred directly to the final receiving substrate.

It is desired to provide a device for use with phase change and curable, such as ultraviolet curable, gel ink printing machines, including duplex machines and direct to paper and direct to web machines, such as a pressure member, wherein the pressure member has the ability to assist in the spreading of the direct to paper developed print without causing alternation to the previously printed ink image which contacts the pressure roller. It is further desired to provide a device that can improve image quality, improve image gloss, and compensate for missing or weak jetting.

Direct to paper as-is printed images can require image conditioning (leveling) to improve image quality and gloss. FIG. 1 illustrates a simplified ink jet printing system 100 wherein a printhead nozzle 102 jets ink droplet 104 directly to a final receiving substrate such as paper 108 to form printed image droplet 106 on the paper 108. Due to surface energy profiles, the jetted ink drops bead up on the surface of paper, resulting in a contact angle between the printed droplet 106 and the paper 108 as indicated by arrows 110, 112, wherein $\gamma_1(T)$ is the surface tension of the ink, $\gamma_2(T)$ is the surface tension of the paper, $\gamma_{12}(T)$ is the interfacial tension between the paper 108 and the ink 106, wherein the force balance in the plane of paper is →$\gamma_1 \cos \theta + \gamma_{12} = \gamma_2$; and
→$\cos \theta = (\gamma_2 - \gamma_{12})/\gamma_1(T)$.

Contact angle pinning, along with presence of intermittent missing and weak jets, can lead to non-uniform streaky ink profiles resulting in low image quality and low gloss image. Several approaches have been proposed to condition a printed image, such as non contact techniques including thermal reflow, air knife shearing, modifying the ink formulation to achieve the desired line width, and contact leveling techniques.

U.S. Patent Publication 20090141110, published Jun. 4, 2009, which is hereby incorporated by reference herein in its entirety, discloses a printing apparatus, including a) a printing station with at least one printhead for applying phase change ink to a substrate in a phase-change ink image, and b) an ink spreading station including a heated or unheated ink spreading member and a back-up pressure member in pressure contact with the ink spreading member, and wherein a nip is formed between the ink spreading member and the back-up pressure member for spreading the phase change ink image on the substrate, wherein said substrate is passed through the nip, and wherein the pressure member includes i) a substrate, and ii) an outer coating having a polymer matrix with an oleophobic resin, a fluoropolymer lubricant, and a first additive.

U.S. Patent Publication 20090142112, published Jun. 4, 2009, which is hereby incorporated by reference herein in its entirety, discloses an offset printing apparatus for transferring and optionally fixing a phase change ink onto a print medium including a) a phase change ink application component for applying a phase change ink in a phase change ink image to an imaging member; b) an imaging member for accepting, transferring and optionally fixing the phase change ink image to the print medium, the imaging member having: i) an imaging substrate, and thereover ii) an outer coating comprising a polymer matrix with an oleophobic resin, a fluoropolymer lubricant, and a first additive; and c) a release agent management system for supplying a release agent to the imagine member wherein an amount of release agent needed for transfer and optionally fixing the phase change ink image is reduced.

While currently available image conditioning methods and devices are suitable for their intended purposes, a need remains for an improved image conditioning surface that can contact an image and level the image while remaining inkphobic enough to prevent offset to the contact leveling surface. There further remains a need for improved image conditioning that provides improved image quality, image gloss, and that compensates for missing or weak jets. There further remains a need for a contact leveling coating that provides green, robust, and reliable image conditioning for ultra-violet curable gel ink print engines. There further remains a need for a contact leveling coating that is wear resistant, thermally stable when heated to operating temperature, has consistent mechanical properties under high load, and resists adhesion of ink.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a contact leveling surface for an ink jet imaging member comprising a coating disposed on a contact leveling substrate, wherein the coating comprises a polyhedral oligomeric silsesquioxane of the formula

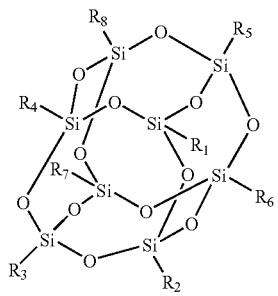

wherein $R_1$, $R_2$, $R_3$, $R_4$, $R_5$, $R_6$, $R_7$, and $R_8$ are each, independently of the other, selected from a fluorine-substituted group comprising (a) alkyl, including linear, branched, saturated, unsaturated, cyclic, acyclic, substituted, and unsubstituted alkyl groups, and wherein hetero atoms in addition to fluorine may optionally be present in the alkyl group; (b) aryl, including substituted and unsubstituted aryl groups, and wherein hetero atoms may optionally be present in the aryl group; (c) arylalkyl, including unsubstituted and substituted arylalkyl groups, wherein the alkyl portion of the arylalkyl group can be linear, branched, saturated, unsaturated, cyclic, or acyclic, and wherein hetero atoms may optionally be present in either or both of the alkyl portion and the aryl portion of the arylalkyl group; (d) alkylaryl, including unsubstituted and substituted alkylaryl groups, wherein the alkyl portion of the alkylaryl group can be linear, branched, saturated, unsaturated, cyclic, or acyclic, and wherein hetero atoms may optionally be present in either or both of the alkyl portion and the aryl portion of the alkylaryl group; (e) siloxyl, including linear, branched, cyclic, acyclic, substituted, and unsubstituted, siloxyl groups, and wherein hetero atoms may optionally be present; (f) silyl, including linear, branched, cyclic, acyclic, substituted, and unsubstituted, silyl groups, and wherein hetero atoms may optionally be present; (g) silane, including linear, branched, cyclic, acyclic, substituted, and unsubstituted, silane groups, and wherein hetero atoms may optionally be present; and (h) a functional group selected from hydroxyl, amine, carboxylic acid, epoxide, fluoroalkyl, halide, imide, acrylate, methacrylate, nitrile, sulfonate, thiol, silanol, and combinations thereof, wherein two or more R groups can be joined together to form a ring.

Also described is a printing apparatus comprising a printing station including at least one printhead for applying ink to an image receiving substrate to create an ink image; a contact leveling member for conditioning the ink image by disposing the contact leveling member in pressure contact with the ink image; wherein the contact leveling member comprises a substrate and a contact leveling coating disposed over the substrate; and wherein the contact leveling coating comprises a polyhedral oligomeric silsesquioxane coating as described herein.

Further described is an image conditioning method comprising forming an image on an image receiving substrate with an ink; conditioning the image by disposing a contact leveling member in pressure contact with the ink image; wherein the contact leveling member comprises a substrate and a contact leveling coating disposed over the substrate; wherein the contact leveling coating comprises a polyhedral oligomeric silsesquioxane coating as described herein.

In embodiments, the contact leveling surface is for an ink jet imaging member and imaging device that jets a phase change ink, a gel ink, a curable phase change ink, or a curable gel ink directly to a final image receiving substrate, such as a direct to paper imaging device.

DETAILED DESCRIPTION

Contact leveling coatings are provided for an ink jet contact leveling surface which resist or prevent altogether offset of a variety of imaging materials such as toners, phase change or solid inks, ultra-violet (UV) curable gel inks, flexographic inks, lithographic inks. In specific embodiments, contact leveling coatings are provided for use with solid inks and curable solid and gel inks such as ultra-violet curable gel inks. The anti-offset contact leveling coatings have advantageous properties which properties remain even after many print cycles. In embodiments the contact leveling coatings comprise fluoroalkyl-substituted polyhedral oligomeric silsesquioxane (POSS) alone or incorporated into a polymer binder matrix as an anti-ink offset contact leveling surface to provide robust and reliable image conditioning (leveling), in a specific embodiment for use with ultra-violet (UV) gel ink print engines. While not wishing to be bound by theory, it is believed that the POSS contact leveling coatings provide anti-wetting properties which translate to anti-offset properties for contact leveling surfaces.

Figure 1:
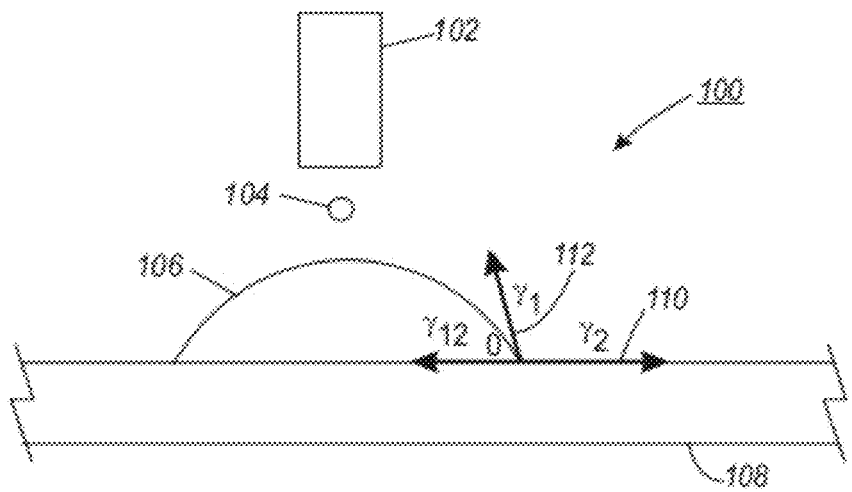
FIG. 1 is an illustration of a jetted ink droplet on a substrate.
Figure 2:
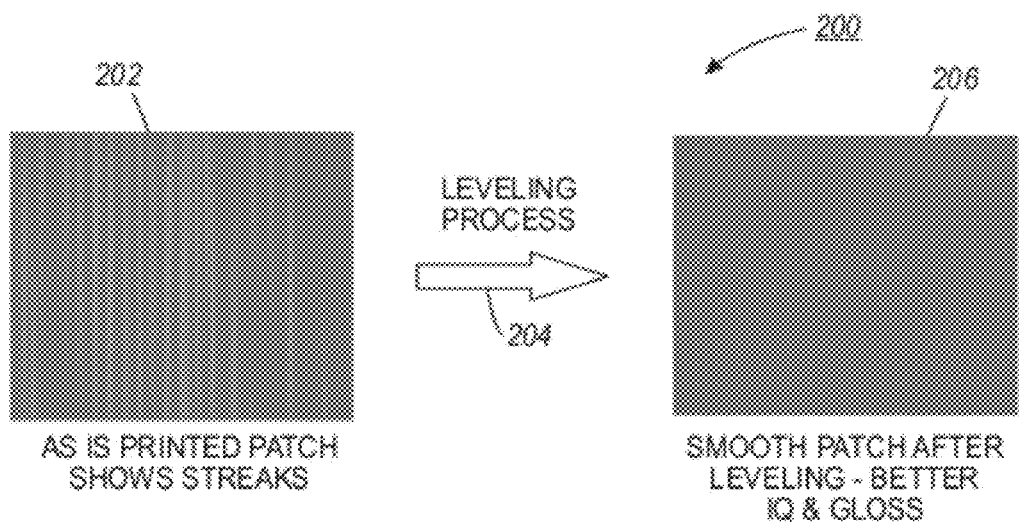
FIG. 2 is an illustration of a printed ink image before and after image conditioning in accordance with the present disclosure.

In embodiments, an image conditioning method is disclosed. In embodiments, an image conditioning method is disclosed for direct to final image receiving substrate imaging devices, such as direct to paper and direct to web machines. In a specific embodiment, an image conditioning method for a direct to paper as-is printed image comprises forming an image on an image receiving substrate with an ink; conditioning the image by disposing a contact leveling member in pressure contact with the jetted ink image; wherein the contact leveling member comprises a substrate and a contact leveling coating as described herein disposed over the substrate to improve image quality such as image gloss. In specific embodiments, the ink is a phase change ink or a gel ink, a curable phase change ink or a curable gel ink, such as ultraviolet curable or visible light curable. FIG. 2 illustrates generally the present process 200 wherein an as-is printed image 202 of a gel-based ink having an undesirable streaky ink profile is treated by the present leveling process 204 to provide conditioned image 206 which exhibits a smooth image having improved overall image quality and improved image gloss.

Figure 3:
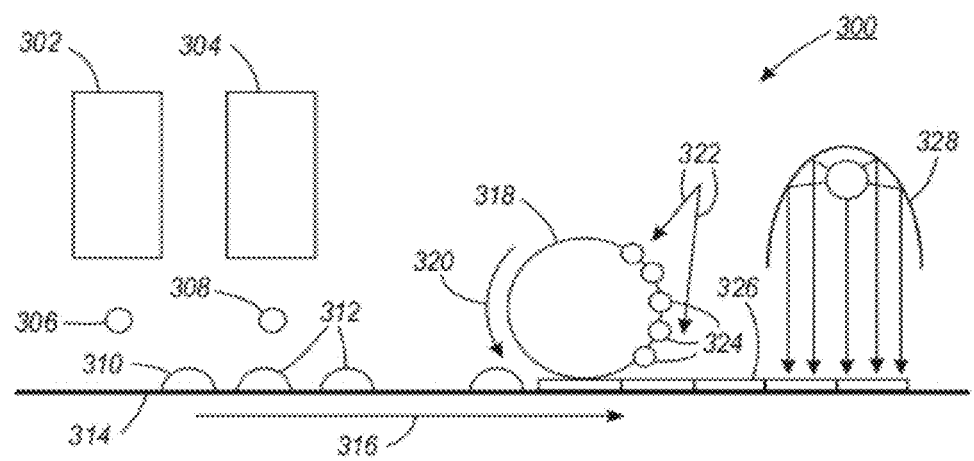
FIG. 3 is an illustration of ink offset on a previously available contact leveling surface.

In further embodiments, an ink jet printing apparatus is disclosed comprising a printing station including at least one printhead for applying ink to an image receiving substrate to create an ink image; a contact leveling member for conditioning the ink image by disposing the contact leveling member in pressure contact with the ink image; wherein the contact leveling member comprises a substrate and a contact leveling coating as described herein disposed over the substrate. Turning to FIG. 3, an ink jet device and contact leveling process 300 includes ink jet printheads 302 and 304 for jetting ink droplets 306, 308 which form jetted ink image droplets 310, 312 on substrate 314, such as paper. Substrate 314 moves in direction of arrow 316 towards a conditioning station including contact leveling roller 318 which moves in the direction of arrow 320. Problematically, offset occurs wherein droplets 324, 326 adhere to the contact leveling roller. The printed image 326 advances in the direction of arrow 316 to UV curing station 328 wherein the ink image is cured. Curing of the ink can be effected by exposure of the ink image to actinic radiation at any desired or effective wavelength, such as from about 10 to about 480 nanometers, or from about 200 to about 480 nanometers, although the wavelength can be outside of these ranges. Exposure to actinic radiation can be for any desired or effective period of time, such as from about 0.2 to about 30 seconds, or from about 1 to about 15 seconds, or from about 1 to about 5 seconds, although the exposure period can be outside of these ranges. By curing is meant that the curable compounds in the ink undergo an increase in molecular weight upon exposure to actinic radiation, such as (but not limited to) crosslinking, chain lengthening, or the like. In a non-UV curable system, curing station 328 would be omitted, or an alternate curing device provided, depending on the nature of the ink selected.

Figure 4:
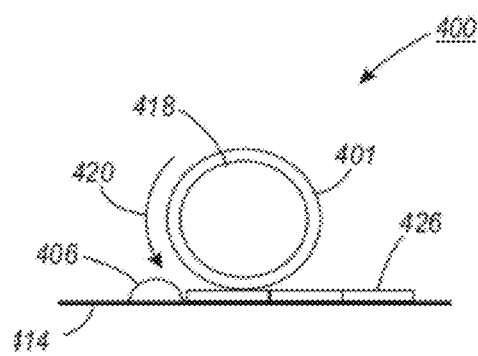
FIG. 4 is an illustration of a contact leveling surface in accordance with the present disclosure wherein there is no ink offset.

Turning to FIG. 4, a system 400 is illustrated, wherein a contact leveling coating 401 in accordance with the present disclosure is disposed on contact leveling roller substrate 418. Ink jet printheads, UV curing station, alternate curing station if non-UV curing is employed, etc., are not shown in FIG. 4 for purposes of simplification but would be generally depicted as in FIG. 3. As described for FIG. 3, an ink jet including ink jet printheads for jetting ink droplets is employed which form jetted ink image droplets on a substrate, such as paper. The substrate moves towards a conditioning station including a movable contact leveling. The present coatings significantly reduce or prevent altogether ink offset to the contact leveling roller. The printed image then advances UV curing station wherein the ink image is cured. The process is described for a UV curable ink. The ink can be any suitable ink. If the ink is not a UV curable ink, an alternate curing station is provided or no curing station in the case of non-curable ink, as would be known to one of skill in the art.

It is understood that the present contact leveling roller 418 having the present contact leveling surface 401 can be disposed in ink jet printing devices currently known or to be developed and is not limited to the devices described herein. It is further understood that while described as a drum or roller, any desired configuration can be selected for the contact leveling device herein, such as a sheet, a film, a web, a foil, a strip, a coil, a cylinder, a drum, an endless strip, a circular disc, a belt including an endless belt, an endless seamed flexible belt, and endless seamless flexible belt, and endless belt having a puzzle cut seam, a weldable seam, and the like, without limitation. The contact leveling roller 418 will typically form a nip with an opposing roller or other device (not shown) situated such that the contact leveling roller is in contact with the image side of the substrate and the opposing roller contacts the non-image side of the substrate.

In embodiments, the process includes increasing the transit speed of the image receiving substrate through the contact leveling nip. In embodiments, transit speeds of from about 1 to about 250, or from about 25 to about 150, or from about 50 to about 100, sheets per second, can be selected. In further embodiments, transit speeds of from about 1 to about 500, or from about 25 to about 200, or from about 75 to about 150, inches per second, can be selected.

The substrate 418 on which the present contact leveling coating 401 is disposed can be any suitable substrate such as any material having suitable strength and other desirable characteristics. Examples of suitable contact leveling substrate materials include metals, rubbers, fiberglass composites, and fabrics. Examples of metals include steel, aluminum, nickel, and the like, along with alloys thereof. The thickness of the substrate can be selected according to the type of imaging member employed. In embodiments where the substrate is a belt, film, sheet, or the like, the substrate thickness is typically from about 0.5 to about 500 millimeters, or from about 1 to about 250 millimeters, although not limited. In embodiments where the substrate is in the form of a drum, the substrate thickness is typically from about 0.8 to about 25 millimeters, or from about 1.6 to about 16 millimeters, although not limited.

Optionally, an intermediate layer can be positioned between the contact leveling substrate 418 and the contact leveling surface coating 401. Materials suitable for use as the intermediate layer can include silicones, fluoroelastomers, fluorosilicones, ethylene propylene diene rubbers, and the like, and mixtures thereof. In embodiments, the intermediate layer is conformable and has a thickness of from about 0.02 to about 6.0 millimeters or from about 0.04 to about 2.5 millimeters, although not limited.

The contact leveling coatings disclosed herein contain one or more POSS compounds. POSS comprises thermally robust cages consisting of a silicon-oxygen core frame-work possessing alkyl functionality on the periphery. POSS materials have been implemented in the development of high performance materials in medical, aerospace, and commercial applications. These molecules can be functionally tuned, are easily synthesized with inherent functionality, and are discreetly nano-sized. Furthermore, POSS compounds may possess a high degree of compatibility in blended polymers and can easily be covalently linked into a polymer backbone. The incorporation of POSS into polymers produces nanocomposites with improved properties, such as, but not limited to, glass transition temperature, mechanical strength, thermal can chemical resistance, and ease of processing.

The contact leveling coatings herein include POSS compounds having the generic formula $(RSiO_{1.5})_n$ wherein R can be any of various hydrocarbons, siloxanes, functional groups, or the like, the R groups can be the same as or different from one another, and n is 6, 8, 10, 12, or higher. The silicon-oxygen framework in POSS molecules generally contains multiple ring structures in which each silicon atom is bound to one organic group and three oxygen atoms to form a fully condensed polycyclic structure. For example, when n is 8, structures as follows can form:

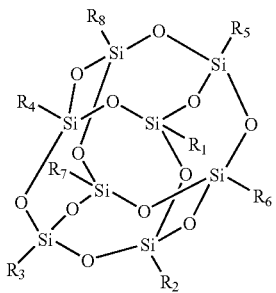

wherein $R_1$, $R_2$, $R_3$, $R_4$, $R_5$, $R_6$, $R_7$, and $R_8$ can be the same as or different from one another and are, for example, alkyl groups, including linear, branched, saturated, unsaturated, cyclic, acyclic, substituted, and unsubstituted alkyl groups, and wherein hetero atoms, such as oxygen, nitrogen, sulfur, silicon, phosphorus, boron, and the like may optionally be present in the alkyl group, having from about 1 to about 36, 6 to about 24, 6 to about 12, or 12 to about 18 carbons, although the number of carbon atoms can be outside of these ranges;

aryl groups, including substituted and unsubstituted aryl groups, and wherein hetero atoms, such as oxygen, nitrogen, sulfur, silicon, phosphorus, boron, and the like may optionally be present in the aryl group, having from about 6 to about 36, or about 6 to about 24, or about 12 to about 18 carbons atoms, although the number of carbon atoms can be outside of these ranges;

arylalkyl groups, including unsubstituted and substituted arylalkyl groups, wherein the alkyl portion of the arylalkyl group can be linear, branched, saturated, unsaturated, cyclic, and/or acyclic, and wherein hetero atoms, such as oxygen, nitrogen, sulfur, silicon, phosphorus, boron, and the like either may optionally be present in either or both of the alkyl portion and the aryl portion of the arylalkyl group, having from about 6 to about 36, or from about 7 to about 36, or from about 12 to about 18 carbon atoms, although the number of carbon atoms can be outside of these ranges, such as benzyl and the like;

alkylaryl groups, including unsubstituted and substituted alkylaryl groups, wherein the alkyl portion of the alkylaryl group can be linear, branched, saturated, unsaturated, cyclic, and/or acyclic, and wherein hetero atoms, such as oxygen, nitrogen, sulfur, silicon, phosphorus, boron, and the like either may optionally be present in either or both of the alkyl portion and the aryl portion of the alkylaryl group, having from about 6 to about 36, or from about 7 to about 36, or from about 12 to about 18 carbon atoms, although the number of carbon atoms can be outside of these ranges, such as tolyl and the like;

siloxyl, silyl, and silane groups, including those that are linear, branched, cyclic, acyclic, substituted, and unsubstituted, and wherein hetero atoms, such as oxygen, nitrogen, sulfur, phosphorus, boron, and the like may optionally be present, having from about 1 to about 12 or from about 3 to about 6 silicon atoms, although the number of silicon atoms can be outside of these ranges, wherein the substituents on the alkyl, aryl, arylalkyl, alkylaryl, siloxyl, silyl, and silane groups can be (but are not limited to) hydroxy groups, halogen atoms, amine groups, imine groups, ammonium groups, cyano groups, pyridine groups, pyridinium groups, ether groups, epoxy groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, alkyl groups, aryl groups, arylalkyl groups, alkylaryl groups, silyl groups, siloxyl groups, silane groups, mixtures thereof, and the like;

wherein two or more R groups and/or substituents can be joined together to form a ring.

The R groups can also be a variety of functional groups, including, but not limited to, alcohol (hydroxyl), amine, carboxylic acid, epoxide, fluoroalkyl, halide, imide, acrylate, methacrylate, nitrile, sulfonate, thiol, silanol, oxide, and the like, as well as mixtures thereof. When n is 6, the corresponding structure has $R_1$, $R_2$, $R_3$, $R_4$, $R_5$, and $R_6$ groups as defined hereinabove for when n is 8. When n is 10, the corresponding structure has $R_1$, $R_2$, $R_3$, $R_4$, $R_5$, $R_6$, $R_7$, $R_8$, $R_9$, and $R_{10}$ groups as defined hereinabove for when n is 8. When n is 12, the corresponding structure has R1, $R_1$, $R_2$, $R_3$, $R_4$, $R_5$, $R_6$, $R_7$, $R_8$, $R_9$, and $R_{10}$, $R_{11}$, and $R_{12}$ groups as defined hereinabove for when n is 8. Also included are compounds wherein one or more of the bonds forming the "cage" structure are opened, allowing the silicon and oxygen atoms to have additional substituents thereon, thus:

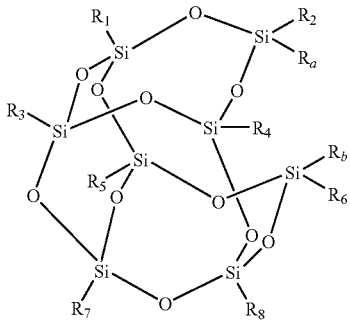

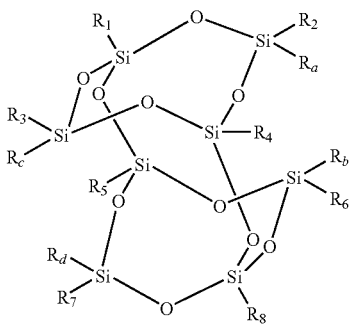

wherein $R_a$, $R_b$, $R_c$, and $R_d$ can have the same definitions as $R_1$ through $R_8$, and can also be substituents, including (but not limited to) imine groups, ammonium groups, cyano groups, pyridine groups, pyridinium groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, azide groups, azo groups, cyanato groups, isocyanato groups, thiocyanato groups, isothiocyanato groups, urethane groups, urea groups, mixtures thereof, and the like, wherein two or more R groups and/or substituents can be joined together to form a ring. Specific examples of compounds of these structures include (but are not limited to) disilanol POSS compounds and tetrasilanol POSS compounds, such as disilanol isobutyl POSS, of the formula

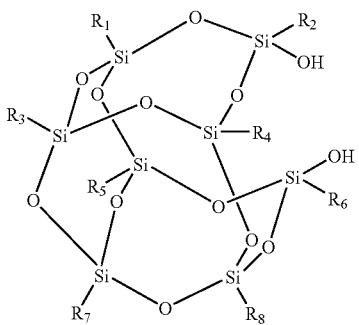

wherein $R_1$, $R_2$, $R_3$, $R_4$, $R_5$, $R_6$, $R_7$, and $R_8$, are all isobutyl, and tetrasilanol phenyl POSS, of the formula

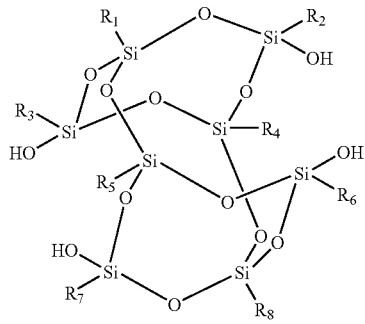

wherein $R_1$, $R_2$, $R_3$, $R_4$, $R_5$, $R_6$, $R_7$, and $R_8$, are all phenyl. Also included are compounds wherein one or more of the silicon atoms and the oxygen atoms bonded thereto are missing, allowing the silicon and oxygen atoms to have additional substituents thereon, thus:

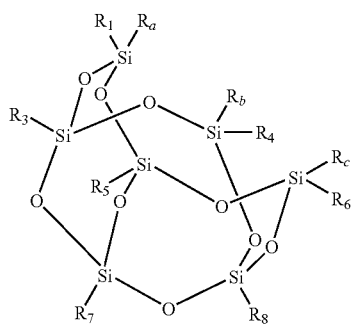

wherein $R_a$, $R_b$, and $R_c$, can have the same definitions as $R_1$ through $R_8$, and can also be substituents, including (but not limited to) hydroxy groups, halogen atoms, amine groups, imine groups, ammonium groups, cyano groups, pyridine groups, pyridinium groups, ether groups, epoxy groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more R groups and/or substituents can be joined together to form a ring. Specific examples of compounds of this structure include (but are not limited to) trisilanol POSS compounds, such as trisilanol phenyl POSS, of the formula

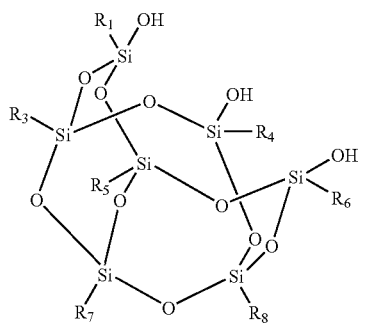

wherein $R_1$, $R_2$, $R_3$, $R_4$, $R_5$, $R_6$, and $R_7$ are all phenyl. Specific examples of suitable R groups include (but are not limited to) phenyl, isobutyl, allyl-bisphenol, cyclopentyl, trimethylsiloxy, methacryl, maleimide, cyclohexyl, and the like.

Specific examples of suitable R groups on the POSS molecules include (but are not limited to) methyl, O—N(CH$_3$)$_{4+}$, ethyl, dibromoethyl, norbornenylethyl, vinyl, trifluoropropyl, chloropropyl, cyanopropyl, mercaptopropyl, aminopropyl, N-methylaminopropyl, propylammonium halide, such as chloride, bromide, iodide, fluoride, and the like, allyl, polyethyleneoxy, of the formula —(CH$_2$CH$_2$(OCH$_2$CH$_2$)$_m$OCH$_3$, wherein m is a number representing the number of repeat OCH$_2$CH$_2$ units, and in one specific embodiment has an average value of about 13.3, isobutyl, cyclopentyl, cyclohexyl, isooctyl, 1-ethyl-3,4-cyclohexanediol, of the formula

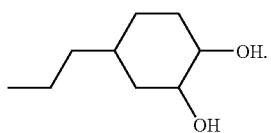

3-hydroxy-3-methylbutyldimethylsiloxyl, of the formula

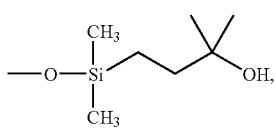

aminoethylaminopropyl, of the formula

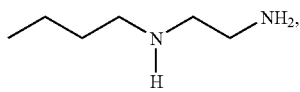

phenyl, chlorobenzyl, chlorobenzylethyl, of the formula

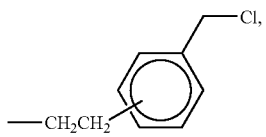

amic acid, of the formula

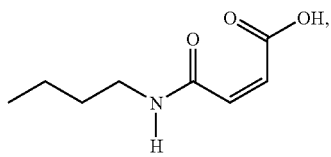

aminophenyl, N-phenylaminopropyl, epoxycyclohexyl, of the formula

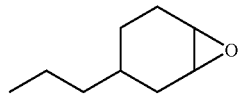

epoxycyclohexyldimethylsilyl, of the formula

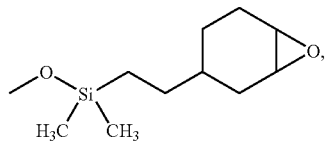

glycidyl, of the formula

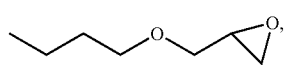

glycidyldimethylsilyl, of the formula

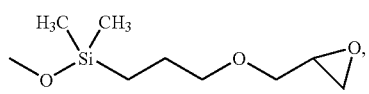

maleimide, of the formula

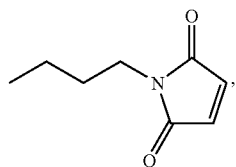

acrylol, of the formula

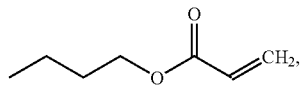

methacryl, of the formula

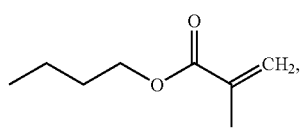

acrylate, of the formula

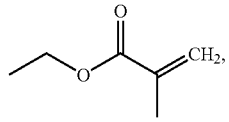

trimethylsiloxyl, of the formula —OSi(CH$_3$)$_3$, norbornenyl, cyclohexenyldimethylsilyl, of the formula

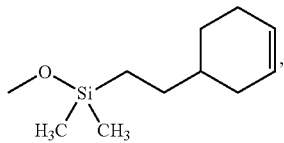

vinyldimethylsilyl, of the formula

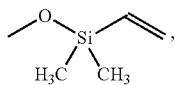

silane, of the formula —OSi(CH$_3$)$_2$H, —H, —OH,

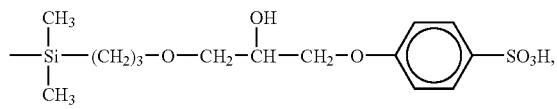

and the like.

In a specific embodiment, the POSS coatings herein comprise a fluoroalkyl-substituted polyhedral oligomeric silsesquioxane. Fluoroalkyl-substituted POSS compounds are thermally and hydrolytically stable and are less hazardous to prepare than other fluorinated compounds. These compounds can also be rendered soluble, which facilitates their incorporation into composite formulations with various polymer systems.

In a specific embodiment wherein the POSS is of the formula

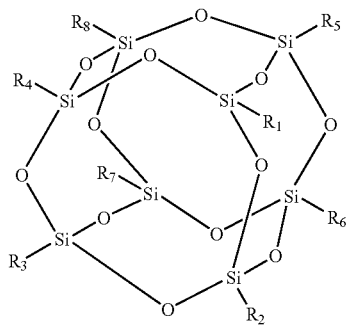

$R_1$, $R_2$, $R_3$, $R_4$, $R_5$, $R_6$, $R_7$, and $R_8$ are each, independently of the other, selected from a fluorine-substituted group comprising (a) alkyl, including linear, branched, saturated, unsaturated, cyclic, acyclic, substituted, and unsubstituted alkyl groups, and wherein hetero atoms in addition to fluorine may optionally be present in the alkyl group; (b) aryl, including substituted and unsubstituted aryl groups, and wherein hetero atoms may optionally be present in the aryl group; (c) arylalkyl, including unsubstituted and substituted arylalkyl groups, wherein the alkyl portion of the arylalkyl group can be linear, branched, saturated, unsaturated, cyclic, or acyclic, and wherein hetero atoms may optionally be present in either or both of the alkyl portion and the aryl portion of the arylalkyl group; (d) alkylaryl, including unsubstituted and substituted alkylaryl groups, wherein the alkyl portion of the alkylaryl group can be linear, branched, saturated, unsaturated, cyclic, or acyclic, and wherein hetero atoms may optionally be present in either or both of the alkyl portion and the aryl portion of the alkylaryl group; (e) siloxyl, including linear, branched, cyclic, acyclic, substituted, and unsubstituted, siloxyl groups, and wherein hetero atoms may optionally be present; (f) silyl, including linear, branched, cyclic, acyclic, substituted, and unsubstituted, silyl groups, and wherein hetero atoms may optionally be present; (g) silane, including linear, branched, cyclic, acyclic, substituted, and unsubstituted, silane groups, and wherein hetero atoms may optionally be present; and (h) a functional group selected from hydroxyl, amine, carboxylic acid, epoxide, fluoroalkyl, halide, imide, acrylate, methacrylate, nitrile, sulfonate, thiol, silanol, and combinations thereof, wherein two or more R groups can be joined together to form a ring;

$R_1$, $R_2$, $R_3$, $R_4$, $R_5$, $R_6$, $R_7$, and $R_8$ are each, independently of the other, selected from a fluorine-substituted group comprising (a) alkyl having from about 1 to about 36 carbon atoms; (b) aryl having from about 6 to about 36 carbon atoms; (c) arylalkyl having from about 6 to about 36 carbon atoms; (d) alkylaryl having from about 6 to about 36 carbon atoms; (e) siloxyl having from about 6 to about 12 silicon atoms; (f) silyl having from about 6 to about 12 silicon atoms; and (g) silane having from about 6 to about 12 silicon atoms;

$R_1$, $R_2$, $R_3$, $R_4$, $R_5$, $R_6$, $R_7$, and $R_8$ are each the same and wherein $R_1$, $R_2$, $R_3$, $R_4$, $R_5$, $R_6$, $R_7$, and $R_8$ are

In further embodiments, the coating comprises at least two different polyhedral oligomeric silsesquioxane compounds. While not wishing to be bound by theory, it is believed that providing a combination of POSS configurations, in specific embodiments a combination of fluoro-substituted POSS, in particular fluoro-alkyl substituted POSS, increased superhydrophobic and superoleophobic properties are achieved for the contact leveling surfaces. Superhydrophobic can be described as when a droplet of water or droplet of liquid forms a high contact-angle, such as greater than about 150°, although not limited. Superoleophobic can be described as when a droplet of a hydrocarbon-based liquid forms a high contact angle, such as greater than 150°, although not limited. Further, the present fluoro-alkyl substituted POSS contact leveling coatings have low surface energy and contribute to the surface roughness of the coatings.

In specific embodiments, the coating comprises a combination of at least two different polyhedral oligomeric silsesquioxane compounds wherein $R_1$, $R_2$, $R_3$, $R_4$, $R_5$, $R_6$, $R_7$, and $R_8$ are selected from

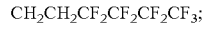

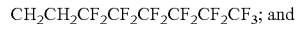; and

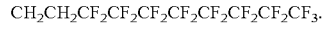.

The POSS compounds can be prepared by any suitable method. In embodiments, the POSS coatings can be prepared using easy, soft-chemistry synthesis to provide superhydrophobic and superoleophobic coatings. The POSS coatings can be either neat or incorporated into composite systems using organic group selection. The POSS coatings herein can be prepared using non-hazardous substances without waste products or by-products except those that can be recycled. For example, in embodiments, the POSS compounds can be synthesized via a single-step, base-catalyzed condensation of trialkoxysilanes in alcoholic media, such as

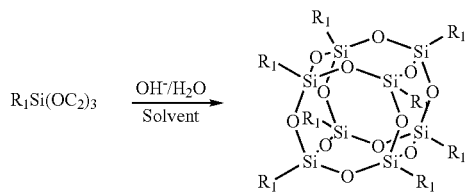

Suitable solvents can be, for example, methyl ethyl ketone, methyl isobutyl ketone, or water. The components can be combined by any suitable method such as standard mixing techniques (stir bar/stir plate) at room temperature as would be known by those of ordinary skill in the art.

This reaction produces nearly quantitative yields of octameric fluoro-substituted POSS compounds, such as
1H,1H,2H,2H-NonaFluorohexyl)$_8$Si$_8$O$_{12}$ (FH)POSS;
(1H,1H,2H,2H-tridecafluorooctyl)$_8$Si$_8$O$_{12}$ (FO)POSS; and
(1H,1H,2H,2H-heptadecafluorodecyl)$_8$Si$_8$O$_{12}$ (FD) POSS;
wherein
for FH, $R_1$ is $CH_2CH_2CF_2CF_2CF_2CF_3$;
for RO, $R_1$ is $CH_2CH_2CF_2CF_2CF_2CF_2CF_2CF_3$; and
for FD, $R_1$ is $CH_2CH_2CF_2CF_2CF_2CF_2CF_2CF_2CF_2CF_3$.

POSS compounds are commercially available from, for example, Hybrid Plastics, Hattiesburg, Miss.

In one embodiment, the contact leveling surface coating is a POSS that is free of a polymeric binder. That is, the POSS material is disposed neat (without binder or solvent) onto the contact leveling substrate to form the contact leveling surface.

In another embodiment, the contact leveling surface coating comprises a POSS and a polymeric binder. Optionally, the POSS may be covalently linked into a polymer backbone. The contact leveling surface coating may comprise a polymeric system containing POSS. Any suitable polymeric binder can be selected including, but not limited to, members of the group consisting of fluoroelastomers, fluoropolymers, polycarbonate, polymethylmethacrylate, polystyrene, polyimide, and polyurethane, and combinations thereof. In another embodiment, the contact leveling surface coating comprises a POSS and a polymeric binder selected from the group consisting of fluoroelastomers, fluoropolymers, polycarbonate, polymethylmethacrylate, polystyrene, polyimide, and polyurethane, and combinations thereof.

In yet another embodiment, the contact leveling surface is a contact leveling surface for an ink jet imaging device that prints direct to a final image receiving substrate; and wherein the ink jet imaging device jets a phase change ink, a gel ink, a curable phase change ink, or a curable gel ink.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Comparative Example 1

A plain contact leveling surface comprising a 4 by 6 inch coupon of biaxially-oriented polyethylene terephthalate film (Mylar®, commercially available from DuPont Teijin Films) was used as the contact leveling surface of Comparative Example 1.

Example 2

0% POSS Viton® control. 50 grams of 20% Viton® GF (tetrapolymer composed of tetrafluoroethylene, vinyldiene fluoride, hexafluoropropylene, and small amounts of a cure site monomer, available from Dupont) in MIBK (methyl isobutyl ketone) solution (by weight), and 3.5 grams of 20% N-aminoethyl-aminopropyl trimethoxysilane in MIBK (by weight), were combined and mixed at ambient temperature for 10 minutes to form a contact leveling coating. The prepared coating was disposed over a 4 by 6 inch polyimide substrate to form a contact leveling coupon. The coated substrate was heated in a convection oven for an appropriate period of time as to effectively provide a permanent, crosslinked coating.

Example 3

25% POSS in Viton®. 16.7 grams of 20% Viton® GF in MIBK (by weight), 1.17 grams of 20% N-aminoethyl-aminopropyl trimethoxysilane in MIBK (by weight), and 5.14 grams of 18% fluorooctyl substituted POSS in MIBK (by weight) were combined and mixed at ambient temperature for 10 minutes to form a contact leveling coating. The prepared coating was disposed over a 4 by 6 inch polyimide substrate to form a contact leveling coupon. The coated substrate was heated in a convection oven for an appropriate period of time as to effectively provide a permanent, crosslinked coating.

Example 4

15% POSS in Viton®. 50 grams of 20% Viton® GF in MIBK (by weight), 3.5 grams of 20% N-aminoethyl-aminopropyl trimethoxysilane in MIBK (by weight), and 11.07 grams of 18% fluorooctyl substituted POSS in MIBK (by weight) were combined and mixed at ambient temperature for 10 minutes to form a contact leveling coating. The prepared coating was disposed over a 4 by 6 inch polyimide substrate to form a contact leveling coupon. The coated substrate was heated in a convection oven for an appropriate period of time as to effectively provide a permanent, crosslinked coating.

Example 5

50% POSS in Viton®. 10 grams of 20% Viton® GF in MIBK (by weight), 0.70 grams of 20% N-aminoethyl-aminopropyl trimethoxysilane in MIBK (by weight), and 12 grams of 18% fluorooctyl substituted POSS in MIBK (by weight) were combined and mixed at ambient temperature for 10 minutes to form a contact leveling coating. The prepared coating was disposed over a 4 by 6 inch polyimide substrate to form a contact leveling coupon. The coated substrate was heated in a convection oven for an appropriate period of time as to effectively provide a permanent, crosslinked coating.

Figure 5:
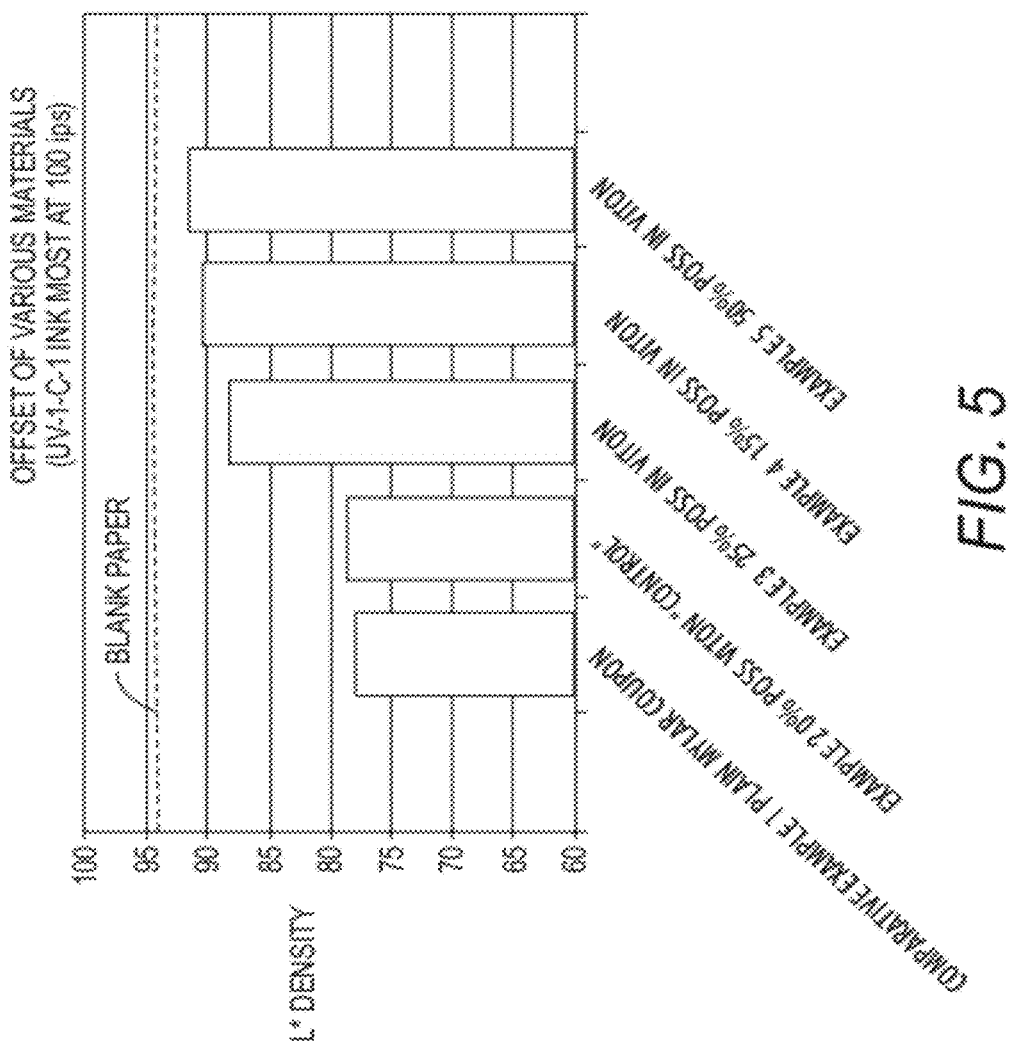
FIG. 5 is a graph illustrating offset of a representative ink formulation on coupons of various materials by L* density (y axis) versus coupon description (x axis).

FIG. 5 illustrates L* Density (y axis) for the Examples tested (x axis).

The contact leveling coatings of Examples 1-5 are summarized in Table 1.

TABLE 1

| Example | Weight Percent POSS |
|---|---|
| 1 | 0 - Mylar ® |
| 2 | 0 |
| 3 | 25 |
| 4 | 15 |
| 5 | 50 |

Figure 6:
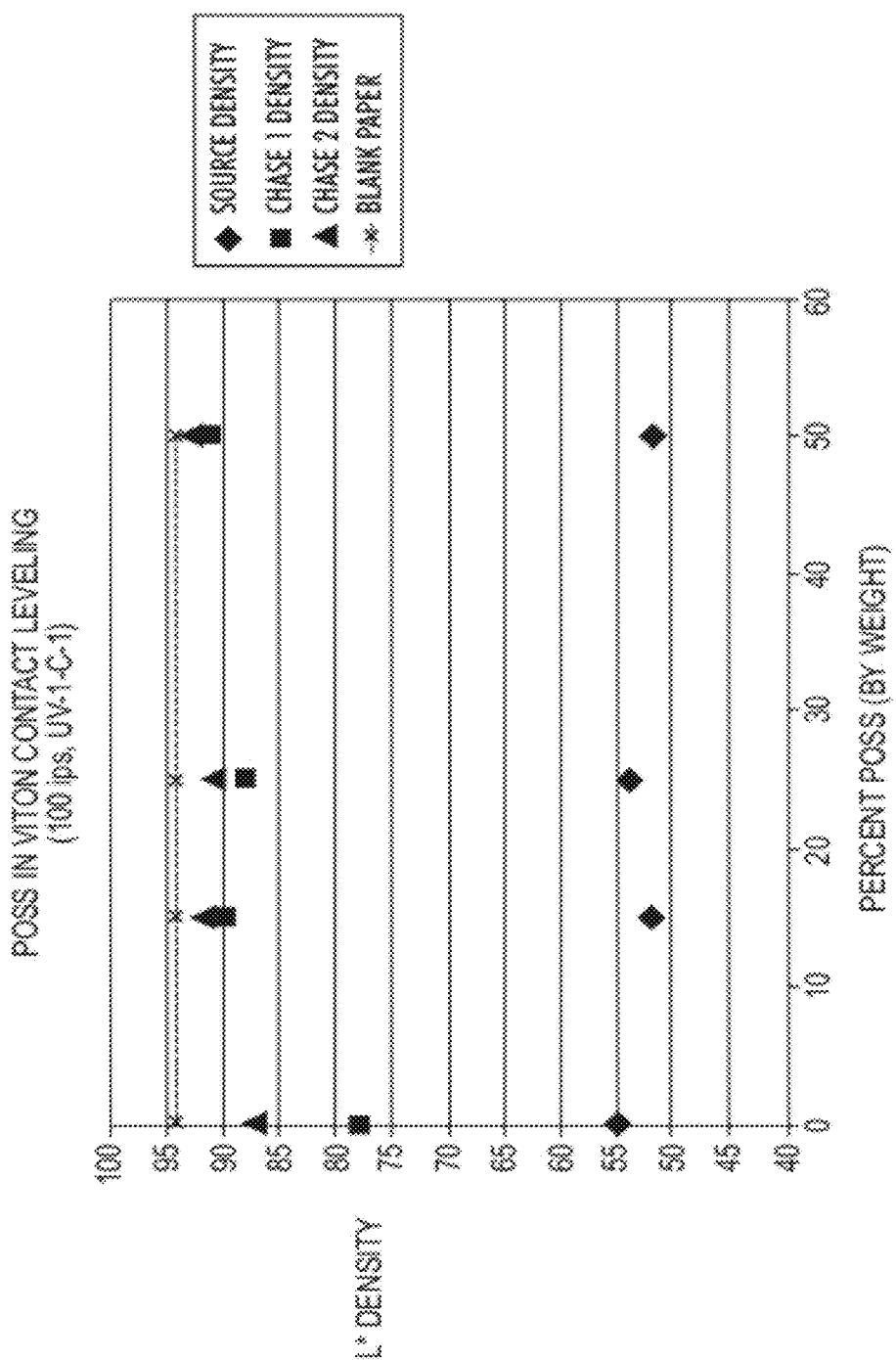
FIG. 6 is a graph illustrating offset of a representative ink formulation on a coupon having a contact leveling surface layer accordance with an embodiment of the present disclosure by L* density (y axis) versus coupon description (x axis).

FIG. 6 illustrates L* (y axis), otherwise known as luminance, versus percent POSS by weight (x axis). An experiment was conducted where gel inks were jetted onto transparencies and the transparencies were subsequently fed through a leveling device with the leveling coupons in the aforementioned examples attached to the leveling roll and immediately followed by a clean "chase" sheet of white paper to determine impact of ink lost from the transparency to the coupon and subsequently transferred via offset to the paper from a first revolution offset (chase 1) and a second revolution offset (chase 2). It was found that measured values of luminance increased with increasing content of POSS in the Viton® substrate. Furthermore, the FIG. 6 shows a horizontal line indicative of L* values one would expect to see for the paper alone and represents the ideal state for any chase. That is, that the chase is equivalent to blank paper. The graph indicates that the addition of POSS clearly is advantaged over a Viton® sample that does not contain POSS, but that increasing amounts of POSS eventually yield reduced rates in improvement to offset.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A contact leveling surface for an ink jet imaging member comprising:
a coating disposed on a contact leveling substrate, wherein the coating comprises a polyhedral oligomeric silsesquioxane of the formula

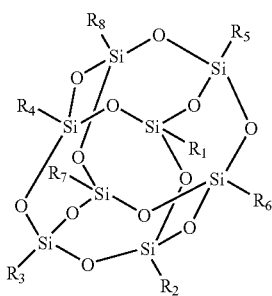

wherein $R_1$, $R_2$, $R_3$, $R_4$, $R_5$, $R_6$, $R_7$, and $R_8$ are each, independently of the other, selected from a fluorine-substituted group comprising:
(a) alkyl, including linear, branched, saturated, unsaturated, cyclic, acyclic, substituted, and unsubstituted alkyl groups, and wherein hetero atoms may optionally be present in the alkyl group;
(b) aryl, including substituted and unsubstituted aryl groups, and wherein hetero atoms may optionally be present in the aryl group;
(c) arylalkyl, including unsubstituted and substituted arylalkyl groups, wherein the alkyl portion of the arylalkyl group can be linear, branched, saturated, unsaturated, cyclic, or acyclic, and wherein hetero atoms may optionally be present in either or both of the alkyl portion and the aryl portion of the arylalkyl group;
(d) alkylaryl, including unsubstituted and substituted alkylaryl groups, wherein the alkyl portion of the alkylaryl group can be linear, branched, saturated, unsaturated, cyclic, or acyclic, and wherein hetero atoms may optionally be present in either or both of the alkyl portion and the aryl portion of the alkylaryl group;
(e) siloxyl, including linear, branched, cyclic, acyclic, substituted, and unsubstituted, siloxyl groups, and wherein hetero atoms may optionally be present;
(f) silyl, including linear, branched, cyclic, acyclic, substituted, and unsubstituted, silyl groups, and wherein hetero atoms may optionally be present;
(g) silane, including linear, branched, cyclic, acyclic, substituted, and unsubstituted, silane groups, and wherein hetero atoms may optionally be present; and
(h) a functional group selected from hydroxyl, amine, carboxylic acid, epoxide, fluoroalkyl, halide, imide, acrylate, methacrylate, nitrile, sulfonate, thiol, silanol, and combinations thereof, wherein two or more R groups can be joined together to form a ring; and wherein the coating is either a neat fluoroalkyl-substituted polyhedral oligomeric silsesquioxane that is free of a polymeric binder or wherein the coating comprises a fluoroalkyl-substituted polyhedral oligomeric silsesquioxane and a polymeric binder selected from the group consisting of fluoroelastomers, fluoropolymers, polycarbonate, polymethylmethacrylate, polystyrene, polyimide, and polyurethane.

2. The contact leveling surface of claim 1, wherein the polyhedral oligomeric silsesquioxane comprises a fluoroalkyl-substituted polyhedral oligomeric silsesquioxane.

3. The contact leveling surface of claim 1, wherein $R_1$, $R_2$, $R_3$, $R_4$, $R_5$, $R_6$, $R_7$, and $R_8$ are each, independently of the other, selected from a group comprising:
(a) alkyl having from about 1 to about 36 carbon atoms;
(b) aryl having from about 6 to about 36 carbon atoms;
(c) arylalkyl having from about 6 to about 36 carbon atoms;
(d) alkylaryl having from about 6 to about 36 carbon atoms;
(e) siloxyl having from about 6 to about 12 silicon atoms;
(f) silyl having from about 6 to about 12 silicon atoms; and
(g) silane having from about 6 to about 12 silicon atoms.

4. The contact leveling surface of claim 1, wherein the polyhedral oligomeric silsesquioxane comprises a compound wherein $R_1$, $R_2$, $R_3$, $R_4$, $R_5$, $R_6$, $R_7$, and $R_8$ are each the same and wherein $R_1$, $R_2$, $R_3$, $R_4$, $R_5$, $R_6$, $R_7$, and $R_8$ are $CH_2CH_2CF_2CF_2CF_2CF_3$;

$CH_2CH_2CF_2CF_2CF_2CF_2CF_2CF_3$; or $CH_2CH_2CF_2CF_2CF_2CF_2CF_2CF_2CF_2CF_3$.

5. The contact leveling surface of claim 1, wherein the coating comprises at least two different polyhedral oligomeric silsesquioxane compounds.

6. The contact leveling surface of claim 1, wherein the coating comprises a combination of at least two different polyhedral oligomeric silsesquioxane compounds wherein $R_1$, $R_2$, $R_3$, $R_4$, $R_5$, $R_6$, $R_7$, and $R_8$ are selected from:

$$CH_2CH_2CF_2CF_2CF_2CF_3;$$

$$CH_2CH_2CF_2CF_2CF_2CF_2CF_2CF_3; \text{ and}$$

$$CH_2CH_2CF_2CF_2CF_2CF_2CF_2CF_2CF_2CF_3.$$

7. The contact leveling surface of claim 1, wherein the contact leveling surface is a contact leveling surface for an ink jet imaging device that prints direct to a final image receiving substrate; and
wherein the ink jet imaging device jets a phase change ink, a gel ink, a curable phase change ink, or a curable gel ink.

8. A printing apparatus comprising:
a printing station including at least one printhead for applying ink to an image receiving substrate to create an ink image;
a contact leveling member for conditioning the ink image by disposing the contact leveling member in pressure contact with the ink image;
wherein the contact leveling member comprises a substrate and a contact leveling coating disposed over the substrate; and
wherein the contact leveling coating comprises a polyhedral oligomeric silsesquioxane of the formula

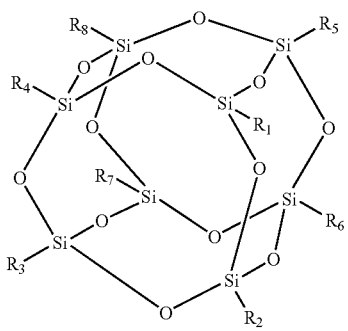

wherein $R_1$, $R_2$, $R_3$, $R_4$, $R_5$, $R_6$, $R_7$, and $R_8$ are each, independently of the other, selected from a fluorine-substituted group comprising:
(a) alkyl, including linear, branched, saturated, unsaturated, cyclic, acyclic, substituted, and unsubstituted alkyl groups, and wherein hetero atoms may optionally be present in the alkyl group;
(b) aryl, including substituted and unsubstituted aryl groups, and wherein hetero atoms may optionally be present in the aryl group;
(c) arylalkyl, including unsubstituted and substituted arylalkyl groups, wherein the alkyl portion of the arylalkyl group can be linear, branched, saturated, unsaturated, cyclic, or acyclic, and wherein hetero atoms may optionally be present in either or both of the alkyl portion and the aryl portion of the arylalkyl group;
(d) alkylaryl, including unsubstituted and substituted alkylaryl groups, wherein the alkyl portion of the alkylaryl group can be linear, branched, saturated, unsaturated, cyclic, or acyclic, and wherein hetero atoms may optionally be present in either or both of the alkyl portion and the aryl portion of the alkylaryl group;
(e) siloxyl, including linear, branched, cyclic, acyclic, substituted, and unsubstituted, siloxyl groups, and wherein hetero atoms may optionally be present;
(f) silyl, including linear, branched, cyclic, acyclic, substituted, and unsubstituted, silyl groups, and wherein hetero atoms may optionally be present;
(g) silane, including linear, branched, cyclic, acyclic, substituted, and unsubstituted, silane groups, and wherein hetero atoms may optionally be present; and
(h) a functional group selected from hydroxyl, amine, carboxylic acid, epoxide, fluoroalkyl, halide, imide, acrylate, methacrylate, nitrile, sulfonate, thiol, silanol, and combinations thereof, wherein two or more R groups can be joined together to form a ring.

9. The printing apparatus of claim 8, wherein the polyhedral oligomeric silsesquioxane comprises a fluoroalkyl-substituted polyhedral oligomeric silsesquioxane.

10. The printing apparatus of claim 8, wherein $R_1$, $R_2$, $R_3$, $R_4$, $R_5$, $R_6$, $R_7$, and $R_8$ are each the same and wherein $R_1$, $R_2$, $R_3$, $R_4$, $R_5$, $R_6$, $R_7$, and $R_8$ are $$CH_2CH_2CF_2CF_2CF_2CF_3;$$

$$CH_2CH_2CF_2CF_2CF_2CF_2CF_2CF_3; \text{ or}$$

$$CH_2CH_2CF_2CF_2CF_2CF_2CF_2CF_2CF_2CF_3.$$

11. The printing apparatus of claim 8, wherein the coating comprises at least two different polyhedral oligomeric silsesquioxane compounds.

12. The printing apparatus of claim 8, wherein the coating comprises a combination of at least two different polyhedral oligomeric silsesquioxane compounds wherein $R_1$, $R_2$, $R_3$, $R_4$, $R_5$, $R_6$, $R_7$, and $R_8$ are selected from:

$$CH_2CH_2CF_2CF_2CF_2CF_3;$$

$$CH_2CH_2CF_2CF_2CF_2CF_2CF_2CF_3; \text{ and}$$

$$CH_2CH_2CF_2CF_2CF_2CF_2CF_2CF_2CF_2CF_3.$$

13. The printing apparatus of claim 8, wherein the coating is a neat fluoroalkyl-substituted polyhedral oligomeric silsesquioxane that is free of a polymeric binder.

14. The printing apparatus of claim 8, wherein the coating comprises a fluoroalkyl-substituted polyhedral oligomeric silsesquioxane and a polymeric binder.

15. The printing apparatus of claim 8, wherein the coating comprises a fluoroalkyl-substituted polyhedral oligomeric silsesquioxane and a polymeric binder selected from the group consisting of fluoroelastomers, fluoropolymers, polycarbonate, polymethylmethacrylate, polystyrene, polyimide, and polyurethane.

16. The printing apparatus of claim 8, printing apparatus is a device that prints direct to a final image receiving substrate; and
wherein the ink is a phase change ink, a gel ink, a curable phase change ink, or a curable gel ink.

17. An image conditioning method comprising:
forming an image on an image receiving substrate with an ink;
conditioning the image by disposing a contact leveling member in pressure contact with the ink image;
wherein the contact leveling member comprises a substrate and a contact leveling coating disposed over the substrate;
wherein the contact leveling coating comprises a polyhedral oligomeric silsesquioxane of the formula

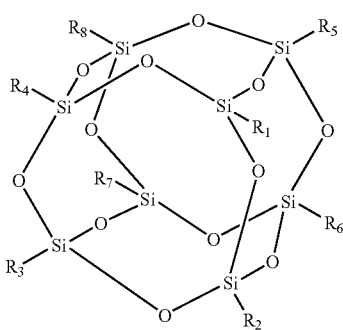

wherein $R_1$, $R_2$, $R_3$, $R_4$, $R_5$, $R_6$, $R_7$, and $R_8$ are each, independently of the other, selected from a fluorine-substituted group comprising:

(a) alkyl, including linear, branched, saturated, unsaturated, cyclic, acyclic, substituted, and unsubstituted alkyl groups, and wherein hetero atoms may optionally be present in the alkyl group;

(b) aryl, including substituted and unsubstituted aryl groups, and wherein hetero atoms may optionally be present in the aryl group;

(c) arylalkyl, including unsubstituted and substituted arylalkyl groups, wherein the alkyl portion of the arylalkyl group can be linear, branched, saturated, unsaturated, cyclic, or acyclic, and wherein hetero atoms may optionally be present in either or both of the alkyl portion and the aryl portion of the arylalkyl group;

(d) alkylaryl, including unsubstituted and substituted alkylaryl groups, wherein the alkyl portion of the alkylaryl group can be linear, branched, saturated, unsaturated, cyclic, or acyclic, and wherein hetero atoms may optionally be present in either or both of the alkyl portion and the aryl portion of the alkylaryl group;

(e) siloxyl, including linear, branched, cyclic, acyclic, substituted, and unsubstituted, siloxyl groups, and wherein hetero atoms may optionally be present;

(f) silyl, including linear, branched, cyclic, acyclic, substituted, and unsubstituted, silyl groups, and wherein hetero atoms may optionally be present;

(g) silane, including linear, branched, cyclic, acyclic, substituted, and unsubstituted, silane groups, and wherein hetero atoms may optionally be present; and (h) a functional group selected from hydroxyl, amine, carboxylic acid, epoxide, fluoroalkyl, halide, imide, acrylate, methacrylate, nitrile, sulfonate, thiol, silanol, and combinations thereof, wherein two or more R groups can be joined together to form a ring.

18. The image conditioning method of claim 17, wherein the polyhedral oligomeric silsesquioxane comprises a fluoroalkyl-substituted polyhedral oligomeric silsesquioxane.

19. The image conditioning method of claim 17, wherein the image is formed directly on the final image receiving substrate; and wherein the ink is a phase change ink, a gel ink, a curable phase change ink, or a curable gel ink.

* * * * *